Dec. 1, 1925.
O. W. HOOPPAW ET AL
DOORLOCK
Filed Jan. 3, 1922
1,563,489
3 Sheets-Sheet 1
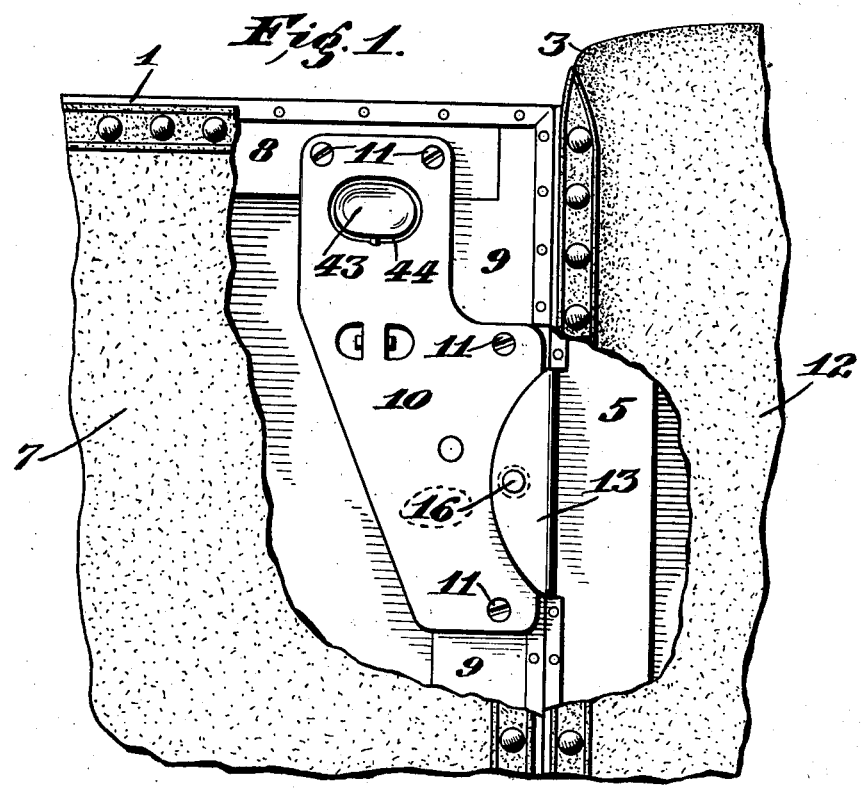
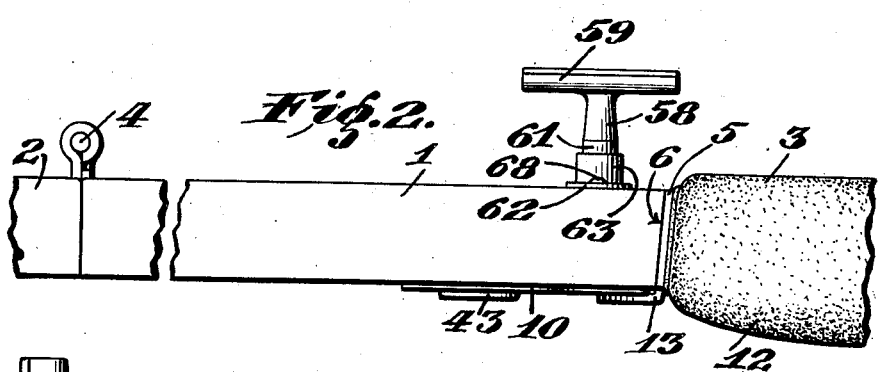
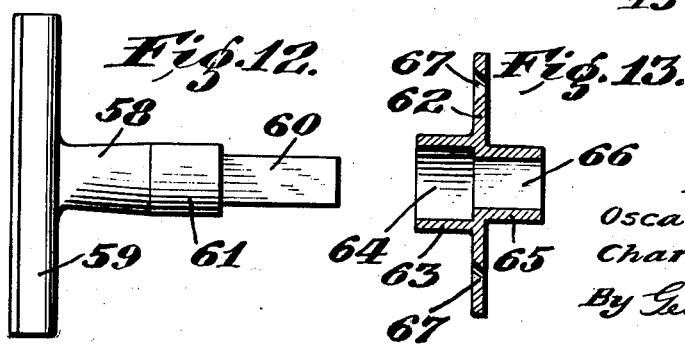
Inventors:
Oscar W. Hooppaw,
Charles A. Rinehart,
By George A. Pennington
their Atty.

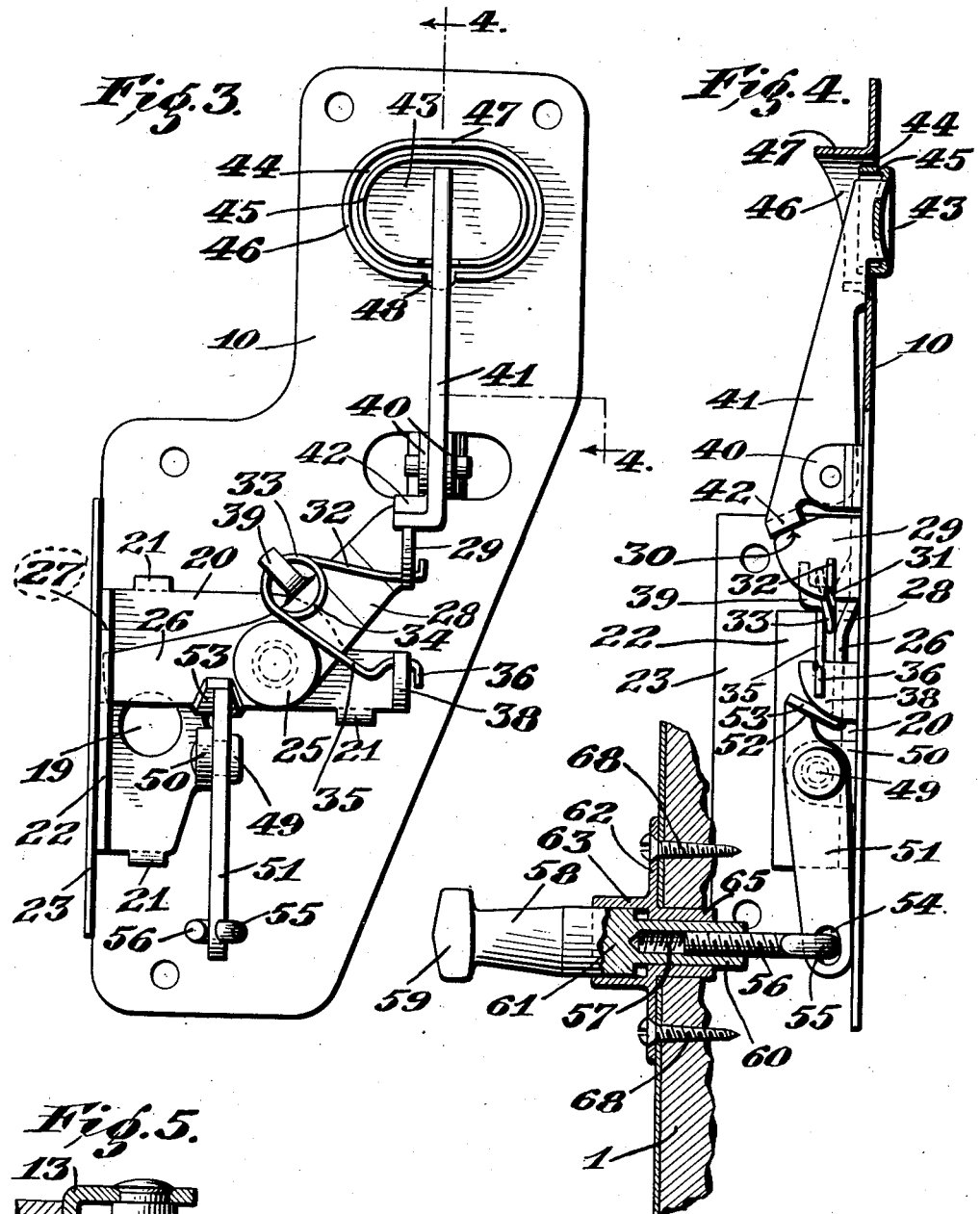

Dec. 1, 1925.
O. W. HOOPPAW ET AL
DOORLOCK
Filed Jan. 3, 1922
1,563,489
3 Sheets-Sheet 3
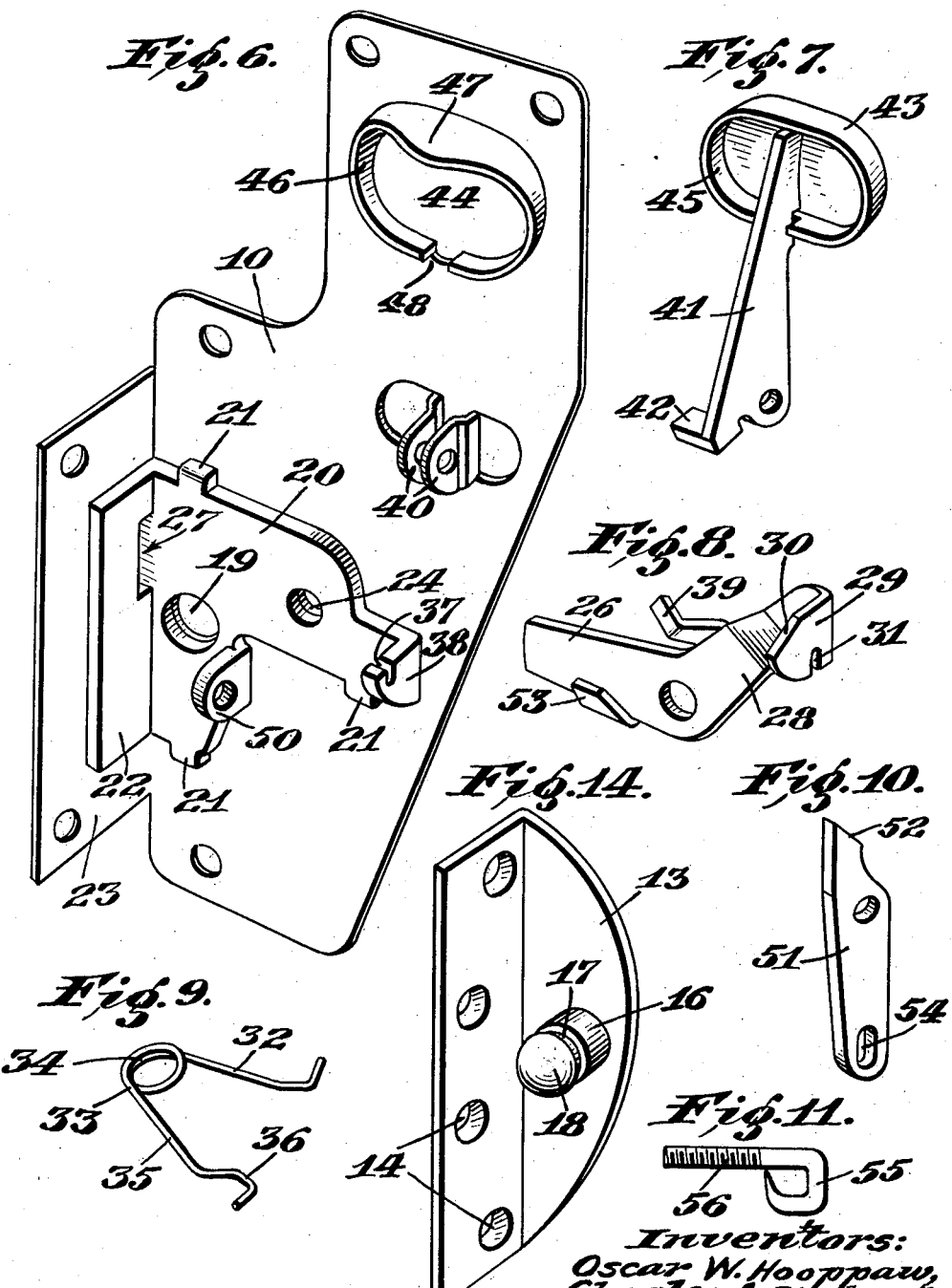

Patented Dec. 1, 1925.

1,563,489

UNITED STATES PATENT OFFICE.

OSCAR W. HOOPPAW AND CHARLES A. RINEHART, OF ST. LOUIS, MISSOURI, ASSIGNORS TO HOOPPAW MANUFACTURING COMPANY, OF ST. LOUIS, MISSOURI, A CORPORATION OF MISSOURI.

DOORLOCK.

Application filed January 3, 1922. Serial No. 526,488.

*To all whom it may concern:*

Be it known that we, OSCAR W. HOOPPAW and CHARLES A. RINEHART, citizens of the United States, residing in the city of St. Louis and State of Missouri, have invented a new and useful Improvement in Doorlocks, of which the following is a specification.

This invention relates to locks and latches. It has more particularly to do with door locks and is especially well adapted for application to and use upon the doors of automobile bodies and the like, but without being necessarily limited to such application and use.

The principal object of the invention is to produce, in a lock of this character, a simple, dependable and durable structure, which is readily installed, permits the door to be closed without slamming, releases easily to permit the door to be opened, at will, yet holds securely against accidental opening, and prevents rattling and sagging of the door. Other important objects and advantages to be attained will more fully appear in the following description.

The invention consists in the parts and in the combinations and arrangements of parts as hereinafter set forth and pointed out with particularity in the appended claims.

In the accompanying drawings forming part of this specification and illustrating a practical adaptation of the invention,—

Figure 1 is a fragmentary view, in elevation, of the adjacent meeting portions of the door and side of an ordinary automobile body, with parts of the upholstery removed to illustrate the installation of a lock according to the present invention;

Figure 2 is a top edge view of the door and adjacent side portions of the automobile body, with the lock installed as shown in Figure 1;

Figure 3 is an inner face view of the lock body plate detached from the door to show the normal correlation of the cooperative parts mounted on said plate;

Figure 4 is an edge view and partial section of the lock body plate on the line 4—4 of Figure 3, and also including a partial section of the automobile door to show the mode of attaching and adjusting the outside handle for the lock;

Figure 5 is a transverse section through the keeper bracket and a fragmentary portion of the door post to which the keeper is attached;

Figure 6 is a perspective view of the lock body plate with the working parts removed therefrom;

Figure 7 is a detail view of the inside handle or push-button which is attached to one of the operating levers;

Figure 8 is a detail view of the pivotal latch member;

Figure 9 is a detail view of the spring which holds the latch member yieldably in normal position;

Figure 10 is a detail view of the operating lever to which the outside handle is connected;

Figure 11 is a detail view of the connecting and adjusting screw for the outside handle and its correlated lever;

Figure 12 is a detail view of the outside handle detached;

Figure 13 is a section of the escutcheon for the outside handle; and

Figure 14 is a perspective view of the keeper bracket detached.

Referring now to the drawings, the numeral 1 designates the door and the numerals 2 and 3, respectively, the adjacent side portions of an ordinary automobile body. The door is hinged, as at 4, in the usual manner, so as to swing outward in opening. As shown (see Figure 2), the meeting edges of the door and the door post 5 are bevelled correspondingly, as at 6. The inner face of the door (see Figure 1) is provided with the usual upholstery panel 7, part of which latter is removed to expose the top rail 8 and end rail 9 of the frame of the door, to which rail members the lock body plate 10 is attached by the screws 11. In this connection, it may be here stated that the lock body plate structure and the manner in which it is fastened to the door serves as a gusset plate or reinforcement of the door frame and obviates the necessity for providing the door frame with the usual supplemental supporting block or frame member for the lock, and at the same time it minimizes the cutting away or mortising of the door frame to accommodate the lock mechanism.

A part of the upholstery 12 of the body of the automobile is also shown removed to expose the door post 5 in the region where the keeper bracket 13 for the lock is attached. The keeper for the lock comprises essentially a suitable bracket member 13, which, as shown, is preferably an angle-plate provided with apertures 14 in one of its flanges (see Figure 14) for the reception of screws or bolts 15 (see Figure 5) by which it is attached to the door post. Preferably, this flange is countersunk into the door post so that the outer face of the flange is substantially flush with the face of the door post. On the other flange of this bracket is a stud 16 having an annular groove 17 and a tapered end portion 18.

The lock body plate 10 is provided with an aperture 19 to receive said stud 16 when the door is closed. This aperture is of a diameter to receive the stud preferably with a rather snug fit, particularly the cylindrical base portion of the stud. That is to say, with practically little or no play laterally of the stud.

On the body plate 10 is a supplemental plate 20 having an aperture of the same size as and registering with the aperture 19. This plate 20, which is provided principally as a reinforcement, may be attached to the body plate 10 in any desirable manner but, preferably, it is provided at three places, as shown, with lugs 21 which are turned at right angles to the body portion of the plate and are of a length sufficient to enter apertures provided therefor in the body plate 10 and in which apertures said lugs are riveted securely.

The supplemental plate 20 has a marginal flange 22 which abuts a marginal flange 23 of the lock body plate 10, said flange 23 being provided for attachment to the end of the door and said flange 22 affording a reinforcement for relieving the flange 23 of thrusts and strains. This supplemental plate 20 is further provided with an aperture 24 registering with a like aperture in the lock body plate 10 to receive and have riveted or otherwise fastened therein the reduced end portion of a shouldered pivot stud 25 for a rocking latch member 26 whose end portion works in a slot 27 provided therefor in said flange 22 of the supplemental plate 20 (see Figures 3 and 6).

The latch member 26 has an angular extension 28, the end portion of which is turned up to constitute a lug 29, one edge portion of which latter is bevelled or inclined, as at 30, to afford a cam face. The opposite edge portion of the lug 29 is provided with a notch 31 to receive the end portion of one leg 32 of a spring element 33 whose middle portion is looped and coiled, as at 34, and whose other leg 35 is hooked, as at 36, and engaged in a notch 37 in the edge of a lug 38 which is turned up from the supplemental plate 20.

The looped middle portion 34 of the spring 33 is overhung by a hooked lug 39 extending up and outward from the margin of the latch member 26 and through said loop with ample clearance and looseness to avoid binding and yet aid in retaining the spring in place.

The spring 33 is constantly under tension and, its legs 32 and 35 acting in opposed relation upon the respective lugs 29 and 38, holds the latch member 26 yieldably in normal position with its end portion against the end of the slot 27 of the flange 22 of the reinforcing plate 20 and also restores it to such normal position after each operation thereof. When in normal position, the edge portion of the member 26 crosses the aperture 19 chord-wise (see Figure 3) so as to enter the groove 17 of the keeper stud 16 when the latter has entered the aperture 19 as the door is closed. In this connection, it may be here stated that, as the tapered head 18 of the stud enters the aperture 19, the latch member 26 is rocked to clear said aperture and as the groove 17 is brought beyond the inner face of the plate 20, the latch member snaps into said groove by the action of the spring 33. The relative width of said groove 17 and thickness of the latch member is such that said latch member readily enters said groove, more or less play being provided for this purpose as may be desired.

Pivoted between ears 40, struck up from the body plate 10, as shown in Figures 3, 4 and 6, is an operating lever 41, at one end of which is an angular projection 42 normally engaging the cam face 30 of the extension 28 of the latch member 26. At the opposite end of the lever 41 is a push-button 43 which projects normally through an opening 44 in the body plate 10. As shown, this push-button is cupped or has its marginal portion flanged, as at 45, and the opening 44 also has a surrounding flange 46 the upper portion of which, 47, is preferably higher than the remainder, while the lower portion is cut away or slotted, as at 48, to provide clearance for the lever 41.

The flange 46, which is provided to afford a guard about the opening 44, is preferably drawn up as an integral part of the body plate 10, as shown, but, obviously, it may be made as a separate piece and attached to the body plate according to any usual or approved practice.

When the push-button 43 is pressed the operating lever 41 is rocked and the latter, in turn, by its engagement with the cam portion of the latch member 26, rocks said latch member so as to move it out of engagement with the keeper stud 16 and clear of the aperture 19; this movement being arrested by the latch member coming in contact with the end of the slot 27 opposite to that against which it is normally held yieldably by the spring 33. When the push-button is relieved of pressure thereon the spring 33, of course, restores to normal position the latch member and the several above noted parts which were operated therewith.

Mounted pivotally, as at 49, on an ear 50 struck up from the supplemental plate 20, is a second operating lever 51 having a bevelled end portion 52 to normally engage an inclined cam projection 53 on said latch member 26. The opposite end portion of this lever 51 is slotted, as at 54, to receive the looped end portion 55 of a screw-threaded connecting stem or member 56, which latter enters a screw-threaded bore 57 in the inner end portion of the stem 58 of a handle 59.

The handle stem 58 has its inner end portion 60 formed polygonal in cross section, preferably square, as shown, and its middle portion 61 cylindrical. To accommodate this handle stem an escutcheon member 62 is provided with an outer collar 63 having a cylindrical interior 64, to which the cylindrical portion 61 of the stem is slidably fitted, and an inner collar 65 with an interior shape 66 which is a counterpart of the cross section of the portion 60 of the stem so as to afford an easy endwise sliding movement of the handle, but at the same time prevent the handle from turning independently of the escutcheon.

The escutcheon, as shown, has two apertures 67 for the reception of screws or bolts 68 by which it is attached to the outer face of the door. By this arrangement, the collar 65, which is preferably cylindrical externally, may be conveniently inserted through an opening provided therefor in the door and in axial alinement with the screw-threaded connecting stem 56, so that the portion 60 of the handle stem may be engaged with said connecting stem and the handle together with the escutcheon turned to effect the adjustment of the handle stem on the connecting stem. When the adjustment is finally effected the escutcheon is secured to the door by the screws or bolts 68. After this is accomplished the handle 59 is prevented from rotating yet is permitted endwise movement in the escutcheon. This adjustment takes care of doors of various thickness.

To open the door from the outside it is only necessary to pull the handle 59, which, through the connection of the member 56, rocks the operating lever 51. The lever 51 whose end portion 52 engages the cam projection 53 of the latch member 26, in turn, rocks the latch member so as to move it out of the groove 17 of the keeper stud 16 and clear of the opening 19 in the lock body plate, the parts being restored to normal position by the spring 33, after the handle 59 is released, just as above pointed out in connection with the operation of the latch member by the actuation of the operating lever 41.

In practice the lock may be provided with only the operating lever 41 and its push-button 43 or the lever 51 and its handle 59, or with both of the operating mediums in the arrangement shown, as may be desired. In any case, however, the operation of the mechanism of the lock to open the door is easily effected with only one motion and that in the natural direction of opening the door. That is to say, the door is opened without first rotating, twisting or rocking the handle to release the latch member from the keeper and necessitating torsional strain upon the hand of the operator to hold the catch in this released condition while pulling the door open. By the present invention it is only necessary to push the inside button or handle, or pull the outside one, the first effect of which is to release the latch member from the keeper stud and the continued push or pull causing the door to swing open.

The construction and arrangement of the lock is also such that the latch member easily engages the keeper and the door may be closed without undue force and slamming, and, when closed, is held securely against accidental opening, as the pull is endwise on the keeper stud and the latch member is always bearing flatwise against the reinforcing plate 20. The stud being practically immovable transversely in the opening 19 or with but very limited movement if any play is allowed at all in that direction, there is no probability of the latch member working and jarring out of the groove in the stud. This structure also permits the use of a much lighter and weaker spring than in the usual and more common types of the locks heretofore in general use, particularly those having latch-bolts slidable endwise and cammed back against a necessarily strong spring in closing the door.

There is a still further advantage in the use of a lock of the character of the present invention in that it holds the door from sagging and pulling endwise away from the door post. The stud of the keeper entering the aperture in the lock body plate, as it does, affords an interlocking engagement which supports the door in every direction transversely or radially from the stud and the tapered head of the stud insures the stud entering the aperture in the lock body plate even though the door be warped, sprung or sag, when open, so as to throw the aperture in the lock body plate considerably out of alinement with the stud of the keeper. So, too, by having the stud fit the aperture rather snugly, rattling of the door is materially eliminated. Also, the keeper flange acts as a bumper or door stop. Furthermore, by having the lock body plate 10 alone, or combined with the reinforcing plate 20, of a thickness greater than the width of the groove 17 in the keeper stud, there is no liability of the lock body plate hanging on the stud in opening and closing the door, as well as affording a sufficient bearing face to minimize wear of the metal surrounding the opening 19.

The arrangement of the operating levers is such that maximum power is obtained with minimum of frictional resistance on the respective cam faces, and the arrangement is also such that oiling and lubricating is facilitated, inasmuch as it is only necessary to apply oil on the lever 41 at a point just below the push-button 43, through the opening 44, whereupon the oil will travel down the lever 41 and follow on the latch member 26 and lever 51, thereby oiling and lubricating the respective pivots and cam faces of said parts.

Obviously, the stud 16 may be rectangular or of a cross section other than round or cylindrical as shown, and the groove 17 may extend only transversely across the upper part of the stud instead of annularly as shown. The entire structure and arrangement of the working parts may also be considerably modified and changed within the spirit and scope of the invention as defined by the appended claims. The invention, therefore, is not limited to the specific construction and arrangement shown in the accompanying drawings.

What is claimed is:

1. In combination with a door-frame pillar and a door arranged to swing in respect to said pillar, of a keeper on said pillar, including a cylindrical stud having a tapered end portion, and a lock-body proper on said door, including a plate having a circular aperture to receive said stud with dowel-like effect, and a latch member on said lock-body plate, said keeper stud and said latch member being relatively arranged and adapted for releasable interlocking engagement.

2. In combination with a door-frame pillar and a door arranged to swing in respect to said pillar, of a keeper on said pillar, said keeper having a projecting portion to overlap the marginal portion of the door and being provided with a door-guide comprising a cylindrical stud having a tapered end portion and a transverse groove between its base and its tapered end portion, and a lock-body proper on said door including a plate having an aperture to receive said keeper stud with dowel-like effect, and a latch member on said lock-body plate to engage in said groove in said keeper stud.

3. In combination with a door-frame pillar and a door arranged to swing in respect to said pillar, of a keeper on said pillar, said keeper having a flange extension to overlap the meeting face of the door and being provided thereon with a rigid cylindrical stud substantially perpendicular thereto, said stud being provided with a transverse groove and a tapered end portion, and a lock-body plate on the meeting face of the door and having an aperture to receive said keeper stud with dowel-like effect, and a spring-pressed latch member on the inner side of said lock-body plate, normally overlapping said aperture substantially chordwise whereby to be moved out of range of said aperture by said keeper stud entering said aperture and whereby also to engage in said groove of said stud in the closed relation of the lock and keeper.

4. In a door lock, a keeper for attachment to the pillar of the door-frame, said keeper having a flange extension overlapping the meeting face of the door and a substantially perpendicular, rigid, cylindrical stud on said flange projecting towards the meeting face of the door, said stud having a transverse groove and a tapered end portion, a lock-body plate on the meeting face of the door, said plate having an aperture to receive said keeper stud with dowel-like effect, a bell-crank latch member pivoted on said lock-body plate, one leg of said bell-crank normally overlapping said aperture substantially chordwise, a spring element yieldably holding said bell-crank in normal position, an actuating lever correlated to said bell-crank, said lever and bell-crank having co-operating cam portions, and an operating handle for said actuating lever.

5. In a door lock, a keeper including a stud having a transverse groove, a lock body proper having an aperture to receive said stud, a pivotal latch element having a portion overlapping said aperture chordwise and being engageable in the groove in said stud, said latch element having a cam portion, an operating lever pivoted on said lock body proper, said operating lever having a cam portion to engage the cam portion of said latch element, a handle for said operating lever to effect the actuation of said latch element to move the latter out of range of said aperture, and a spring acting upon said latch element direct for yieldably holding it in normal position and for restoring it to such position when the handle is relieved of power.

6. In a door lock, a keeper including a stud having a transverse groove, a lock body plate for attachment to the door, said plate having an aperture to receive said keeper stud, a reinforcing plate on said body plate, said reinforcing plate having an aperture like and registering with the aperture in said body plate, a pivotal latch element mounted on said reinforcing plate and having a portion movable flatwise on the face of said reinforcing plate and normally overlapping the aperture therein substantially chordwise and being engageable in the groove in said keeper stud, the end of said latch element working in a slot provided therefor in a flanged marginal portion of said reinforcing plate and said latch element also having a cam portion, an operating lever pivoted on said body plate and having a cam portion cooperating with the cam portion of said latch element, an actuating handle for said operating lever, and a spring interposed between said reinforcing plate and said latch element for holding said latch element and said operating lever yieldably in normal position and for restoring them to such position when the handle is relieved of power.

7. In a door lock of the character described, the combination with an actuator lever having a screw-threaded stem hinged thereto, of an escutcheon member for fixed attachment to the door, said escutcheon member having an opening therethrough of non-circular cross section, and a handle member having a shank portion which is a counterpart of said opening in said escutcheon member and being longitudinally slidable therein, said shank portion having a screw-threaded bore to receive said screw-threaded stem of said actuator lever.

8. In a door lock, a keeper having a combined door-guiding and latching stud, said stud having a transverse groove and a tapered end portion, and a lock-body plate having an aperture to receive said stud with dowel-like effect, the width of the wall surrounding said aperture being greater than the width of the slot in said keeper stud.

Signed at St. Louis, Missouri, this 21st day of December, 1921.

OSCAR W. HOOPPAW.
CHARLES A. RINEHART.